US010740451B1

(12) United States Patent
Meyer

(10) Patent No.: US 10,740,451 B1
(45) Date of Patent: *Aug. 11, 2020

(54) GRAPHICAL EVENT-BASED PASSWORD SYSTEM

(71) Applicant: United Services Automobile Association ("USAA"), San Antonio, TX (US)

(72) Inventor: Gregory Brian Meyer, San Antonio, TX (US)

(73) Assignee: United Services Automobile Association ("USAA"), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,534

(22) Filed: May 21, 2019

Related U.S. Application Data

(63) Continuation of application No. 15/251,774, filed on Aug. 30, 2016, now Pat. No. 10,331,873.

(60) Provisional application No. 62/239,612, filed on Oct. 9, 2015.

(51) Int. Cl.
*G06F 21/36* (2013.01)
*G06F 21/32* (2013.01)
*G06F 3/0484* (2013.01)
*G06F 3/0488* (2013.01)
*G06K 9/00* (2006.01)

(52) U.S. Cl.
CPC ............ *G06F 21/36* (2013.01); *G06F 3/0488* (2013.01); *G06F 3/04842* (2013.01); *G06F 21/32* (2013.01); *G06K 9/00087* (2013.01)

(58) Field of Classification Search
CPC .... G06F 21/36; G06F 3/04842; G06F 3/0488; G06F 21/32; G06K 9/00087
See application file for complete search history.

(56) References Cited

U.S. PATENT DOCUMENTS

| 2010/0220900 | A1* | 9/2010 | Orsley ................. G06F 3/0421 382/124 |
| 2012/0030623 | A1* | 2/2012 | Hoellwarth ......... G06F 3/04817 715/811 |
| 2013/0061175 | A1* | 3/2013 | Matas .................. G06F 3/0485 715/810 |
| 2014/0317723 | A1* | 10/2014 | Hicks ..................... G06F 21/36 726/19 |

(Continued)

*Primary Examiner* — Techane Gergiso
(74) *Attorney, Agent, or Firm* — Locke Lord LLP; Christopher J. Capelli

(57) ABSTRACT

A computer system and method having a user interface including a touch-sensitive display screen. The system and method enables entry of a password which includes displaying a first array of a plurality of images on the touch-sensitive display prompting a user to select with a finger one of the plurality of images displayed. Subsequently at least another array of a plurality of images successive to the first array is displayed on the touch sensitive display prompting a user to select with a finger one of the plurality of images displayed in the another array of images. A computer processor then determines if a user selected a predetermined iage from the first array of the plurality of images and a predetermined image from each at least another array of plurality of images displayed after the first array. If determined, the user is permitted access to an application executable on the computer system.

18 Claims, 4 Drawing Sheets

(56) References Cited

U.S. PATENT DOCUMENTS

| | | | |
|---|---|---|---|
| 2014/0341446 A1* | 11/2014 | Hare | G06F 3/0416 |
| | | | 382/124 |
| 2014/0359757 A1* | 12/2014 | Sezan | G06F 21/32 |
| | | | 726/19 |
| 2015/0074615 A1* | 3/2015 | Han | G06K 9/00033 |
| | | | 715/863 |
| 2015/0135108 A1* | 5/2015 | Pope | G06K 9/00006 |
| | | | 715/767 |
| 2016/0062573 A1* | 3/2016 | Dascola | G06F 3/0482 |
| | | | 715/810 |
| 2016/0063300 A1* | 3/2016 | Du | G06K 9/00033 |
| | | | 382/124 |
| 2016/0063828 A1* | 3/2016 | Moussette | G08B 6/00 |
| | | | 340/540 |
| 2016/0246396 A1* | 8/2016 | Dickinson | G06F 3/03545 |

\* cited by examiner

GRAPHICAL EVENT-BASED PASSWORD SYSTEM

CROSS REFERENCE TO RELATED APPLICATIONS

This application is a Continuation of U.S. patent application Ser. No. 15/251,774 filed Sep. 30, 2016 which is incorporated herein by reference in its entirety.

FIELD OF THE INVENTION

The present invention relates generally to processing systems and specifically relates to password systems used to allow access to particular resources, generally with computer based machines.

BACKGROUND OF THE INVENTION

Password systems have been used with computer based machines for many years. A typical password may be, for example, a four-digit number, for example '1234'. In such a case if one wants to start using a particular computer program or for the computer based machine to perform a certain action, the machine asks a password, and if in this case, the number '1234' is entered (usually via a keyboard or keypad, but equivalent ways may be via speaking a word into a language recognition system, etc), then the particular computer program or action starts. If the wrong password, for example in this case, '1234', was entered, then the particular program or particular action would not occur, and the user may (or may not) receive an error message from the computer.

Many password systems exist. While a four-digit number is a popular system, used at automatic bank machines, for example, many other password systems use longer numbers or also allow a wider variety of alphanumeric characters. More possibilities in a password, do allow better security since more incorrect choices must be attempted to arrive at the password by such attempts. However, the problem with all such types of password systems, is that the user is expected to memorize his/her password. A four-digit password is work enough to memorize, a longer password is even more difficult. As well, a user may have many such passwords to memorize as required by many different computer programs or computer-based machines he/she normally uses. What typically happens in such cases is that persons write their passwords down on pieces of paper they keep on their desks or in their pockets, and security is badly compromised. Or to avoid needing to write their passwords down, persons may choose easy to remember passwords such as their pet's name or the last four digits of their telephone number, etc. Again, security is again compromised, since this information is usually readily available to others who may want to try this information as a possible password choice for that individual. (Another reason why security is compromised in such cases is because it is often possible to program another computer system to try all the four-digit numbers or all the words in a dictionary, etc, in order to inappropriately enter a password protected system.) As daily life in a technological society involves use or more and more computer-based machinery, and the consequences of using such computer-based machinery becomes more important, the issue of memorizing passwords or using simple words as passwords, becomes more and more serious.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, A computer system and method having a user interface including a touch-sensitive display screen is described in which provides for entry of a password which includes displaying a first array of a plurality of images on the touch-sensitive display prompting a user to select with a finger one of the plurality of images displayed. Subsequently at least another array of a plurality of images successive to the first array is displayed on the touch sensitive display prompting a user to select with a finger one of the plurality of images displayed in the another array of images. A computer processor then determines if a user selected a predetermined image from the first array of the plurality of images and a predetermined image from each at least another array of plurality of images displayed after the first array. If determined, the user is permitted access to an application executable on the computer system.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
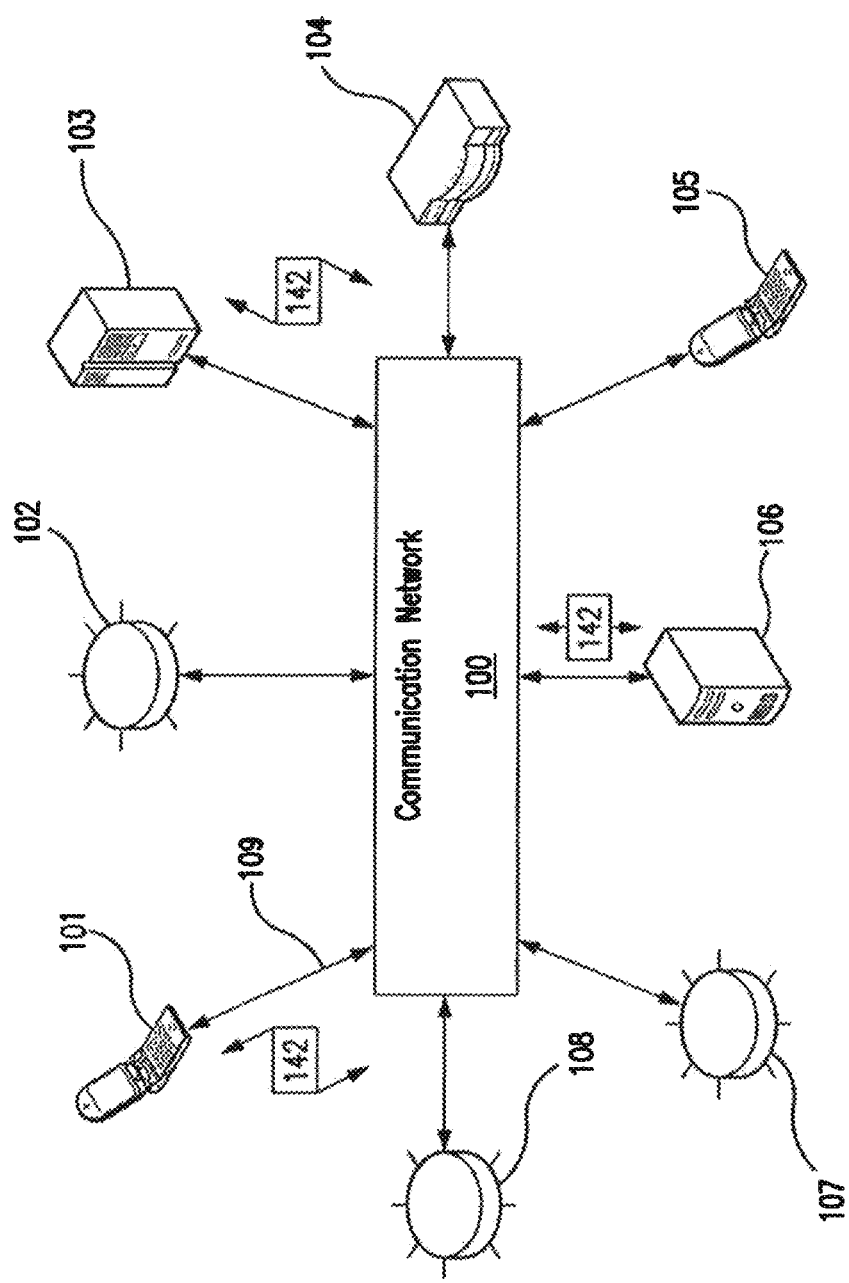
FIG. 1 illustrates an example communication network used with the present invention.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103 (including kiosk devices (e.g., ATM devices), smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
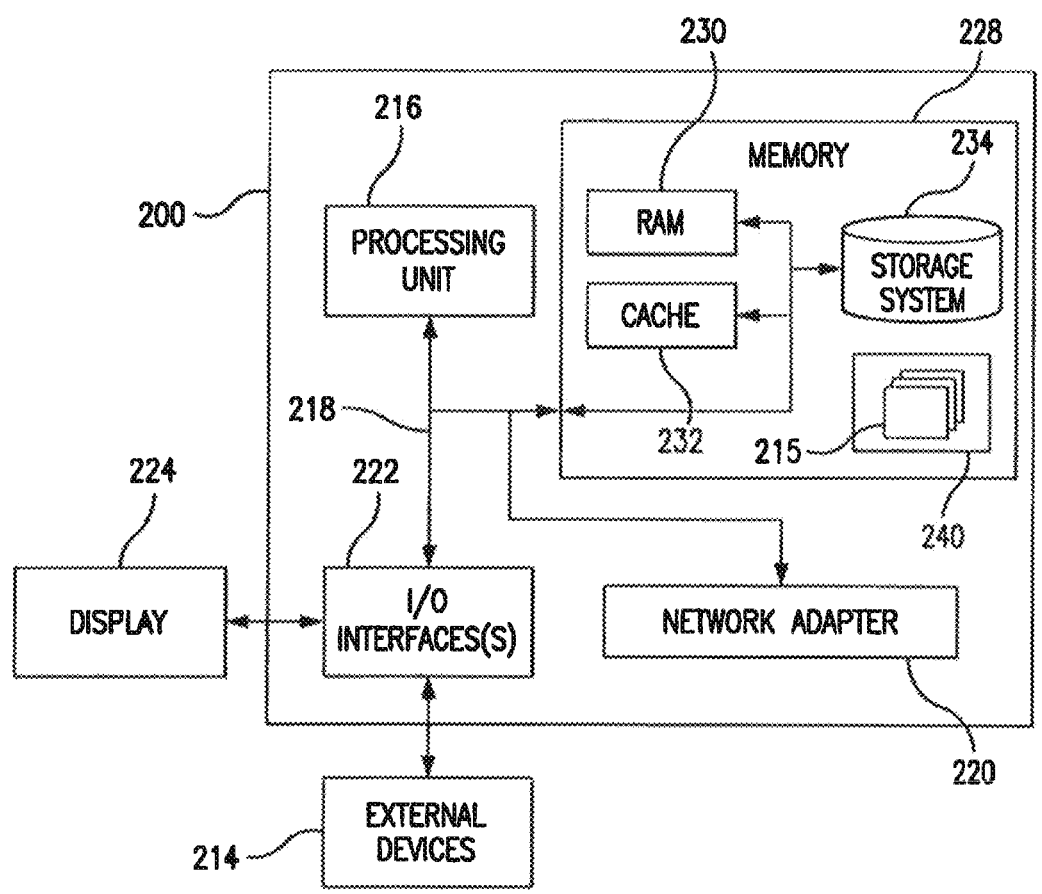
FIG. 2 illustrates an example network device/node used with the present invention.

FIG. 2 is a schematic block diagram of an example network computing device 200 (e.g., client computing device 103, smart phone devices 105, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein.

Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as password module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/0) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present invention will now be provided. In accordance with the illustrated embodiments, it is to be appreciated that with the proliferation of security issues, two and three component logons have created a problem for customers in that it becomes necessary to record logon information or store it in a password keeping application. The present invention preferably utilizes newly available fingerprint capturing technology with a member specific logon component that is based on shape and color/pattern (changed by customer to account for macular issues or colorblindness) that may randomly change for each successive step. It is to be further appreciated the below described invention provides an intuitive interface (similar to the APPLE™ 4 digit logon), however, it is also unique to an individual and may be based on a plurality of successive finger prints (e.g., 3). Randomization of each touch interaction adds to the security while reducing the ability of an unscrupulous person from trying to acquire the "code" from a distance.

Figures 3A, 3B, 3C:
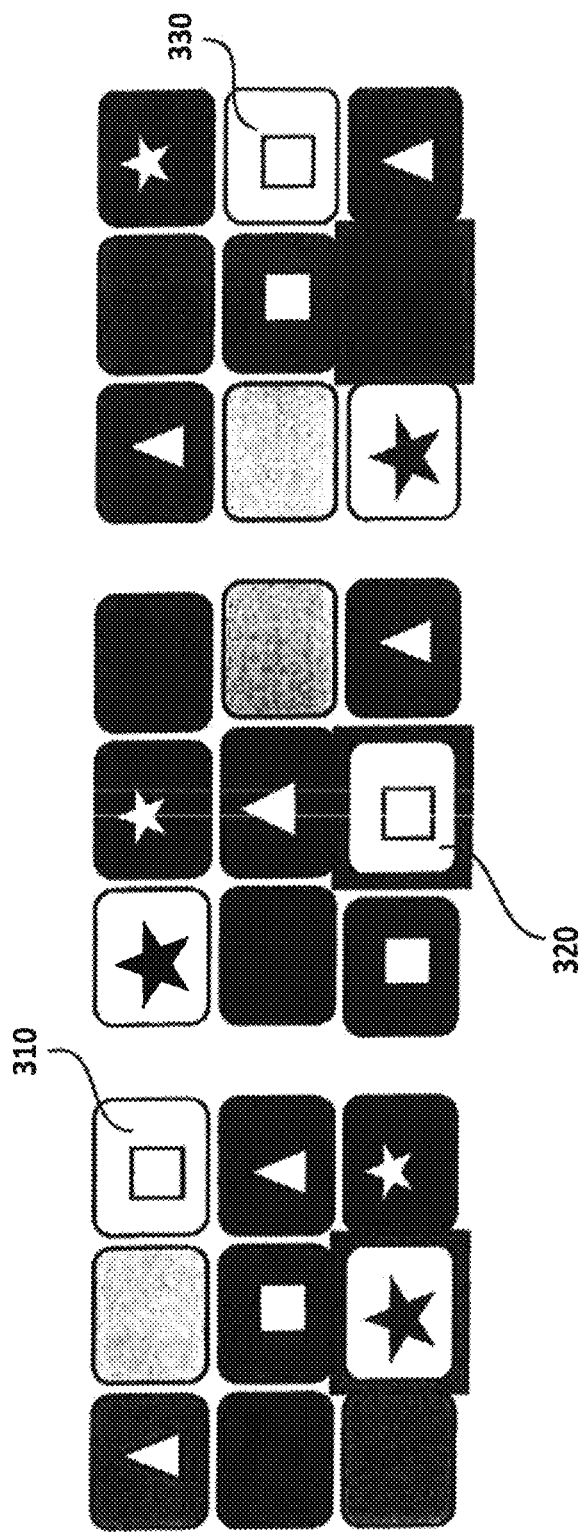
FIGS. 3A-3C illustrate successive screen displays in accordance with an embodiment of the present invention.

For illustrative purposes, reference is now provided to successive screen displays of FIGS. 3A-3C to preferably be provided on a touch-sensitive screen display configured to capture a user's fingerprint upon interaction therewith. In this illustrative embodiment, the user has preferably interacted with computer system 200 such that password module 215 is programmed to have a predetermined visual password sequence for the user preferably consisting of a hybrid of shape/colors and fingerprints pertinent to a specified number of successive displays to be presented. For instance, the user may specify that their visual password sequence is to have three successive screen displays (FIGS. 3A-3C) with each display having a predetermined shape/color to be choosen by a specified finger—a yellow square 300, 310 and 330 is to be choosen in each display (FIGS. 3A-3C), wherein the first yellow square 300 of the first display (FIG. 3A) is to be selected with the user's thumb, a second yellow square 310 of the second display (FIG. 3B) is to be selected with the user's fore finger, and a third yellow square 320 of the third display (FIG. 3C) is to be selected with the user's middle finger. In use, when system 200 determines a password is necessary to gain access to a certain application (e.g., a banking application), password module 215 retrieves the password application for the current user. In accordance with the predetermined password routine mentioned above, password module 215 causes display 224 to display a first screen (FIG. 3A) and await user input. If system 200 determines the user selected the yellow square 300 with their thumb, the second screen (FIG. 3B) is caused to be displayed. If system 200 then determines from the second screen (FIG. 3B) the user chose the yellow square 310 with their forefinger, the third screen (FIG. 3C) is caused to be displayed. If system 200 then determines from the third screen (FIG. 3C) the user chose the yellow square 310 with their middle finger, access is permitted to the requested application (e.g., the banking application).

It is to be appreciated the above example of a predetermined password sequence is provided for illustrative purposes only and is not to be limited thereto as any sequence of shape/color graphic patterns may be used with any sequence (if at all) of any fingers to be used by a user.

Figure 4:
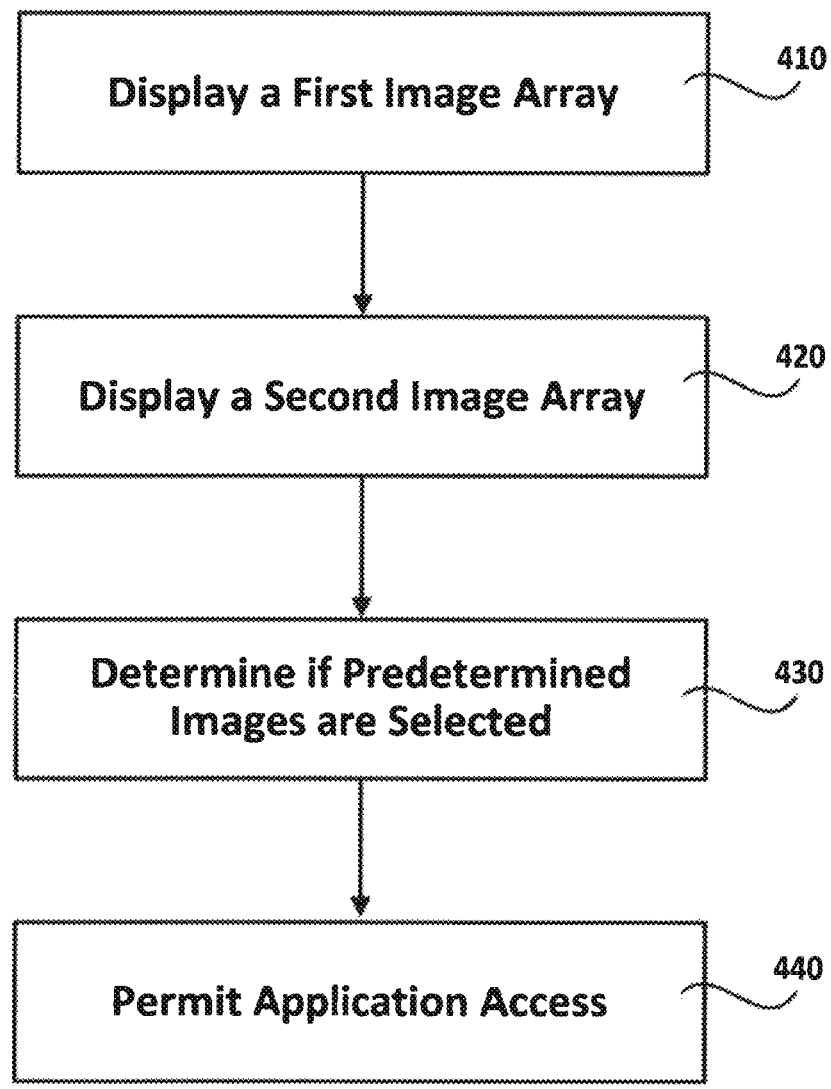
FIG. 4 illustrates a flow diagram for an embodiment of the present invention.

Reference is now made to FIG. 4, illustrating a flow diagram to be executed by the computer system 200 in accordance with the present invention. It is noted that the order of steps shown in FIG. 4 is not required, so in principle, the various steps may be performed out of the illustrated order. Also certain steps may be skipped, different steps may be added or substituted, or selected steps or groups of steps may be performed in a separate application following the embodiments described herein.

Starting at step 410, when system 200 determines a password is necessary to gain access to a certain application (e.g., a banking application), password module 215 executes a password application as mentioned above in which a first array preferably of a plurality of images is displayed on a touch sensitive screen 224 prompting a user to select with a finger one of the plurality of images displayed. Next, step 420, at least another array preferably of a plurality of images is displayed on the touch sensitive screen 224 prompting a user to select with a finger one of the plurality of images displayed in the another array of images. It is noted the present invention encompasses displaying any plurality of successive screens to the first array in accordance with the teachings herein. For instance, as described above with reference to FIGS. 3A-3C, two successive screens (3B, 3C) to the first screen (3A) were displayed. Additional, each image in each array of images may comprise a certain shape, graphic and or color pattern. Further, it may be predetermined that each selected image for each array may be associated with a particular user finger, as verified via finger print recognition techniques.

Next (step 430), system 200 determines if a user selected a predetermined image from the first array of the plurality of images and a predetermined image from each at least another array of plurality of images displayed after the first array with preferably a certain user finger. For instance, was a yellow square selected from each of the three successively displayed screens wherein a user used a thumb for the first array, a fore finger for the second array and a middle finger for the third array. If it is determined a proper predetermined image was selected from each image array with a proper predetermined user finger, than system 200 permits user access to the requested application. It is noted an array of a plurality of images is preferably displayed on the touch-sensitive display only if it is determined a user selected a predetermined image from an immediately prior predecessor array of a plurality of images displayed on the touch sensitive display 224.

It is to be appreciated that a predetermined image may be the same, or a different image in the first and at least another array in each plurality of images. The determining step may additional include biometric recognition to determine predetermined biometrics from user interaction with the computer system 200. It is to be further appreciated the computer system 200 may be embodied in a smart phone device, other portable computing device, a kiosk computing device (e.g., ATM machine) and the like.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. In a computer system having a user interface including a touch-sensitive display screen, a method for providing entry of a password, the method comprising:
    display a first array of a plurality of images on the touch-sensitive display prompting a user to select with a finger one of the plurality of images displayed;
    display at least another array of a plurality of images successive to the first array on the touch sensitive display prompting a user to select with a finger one of the plurality of images displayed in the another array of images;
    determine by a processor if a user selected a predetermined image from the first array of the plurality of images and a predetermined image from each at least another array of plurality of images displayed after the first array and determine finger print recognition from user interaction with the computer system; and
    permit user access to an application executable on the computer system contingent upon the determining step.

2. The computer system as recited in claim 1, wherein the at least another array of a plurality of images successive to the first array includes a second and third array of a plurality of images.

3. The computer system as recited in claim 1, wherein each image in each array of a plurality of images corresponds to a graphic image.

4. The computer system as recited in claim 3, wherein each image in each array of a plurality of images corresponds to a certain color.

5. The computer system as recited in claim 1, wherein an array of a plurality of images is displayed on the touch-sensitive display only if it is determined a user selected a predetermined image from an immediately prior predecessor array of a plurality of images displayed on the touch sensitive display.

6. The computer system as recited in claim 1, wherein the predetermined image is a same image in the first and at least another array of a plurality of images.

7. The computer system as recited in claim 1, wherein the predetermined image is a different image in the first and at least another array of a plurality of images.

8. The computer system as recited in claim 1, wherein the determining step determines if a predetermined user finger recognition corresponds to a predetermined image.

9. The computer system as recited in claim 8 wherein the predetermined user finger recognition corresponds to a predetermined user finger.

10. The computer system as recited in claim 1, wherein the determining step determines if a predetermined user finger recognition corresponds to a predetermined image in one of the arrays displayed on the touch-sensitive display.

11. The computer system as recited in claim 10 wherein the predetermined user finger recognition corresponds to a predetermined user finger.

12. The computer system as recited in claim 1, wherein the computer system is embodied in a smart phone device.

13. The computer system as recited in claim 1, wherein the computer system is embodied in a portable computing device.

14. The computer system as recited in claim 1, wherein the computer system is embodied in a kiosk computing device.

15. The computer system as recited in claim 1, wherein the computer system is embodied in a banking institution Automated Teller Device (ATM).

16. In a computer system having a user interface including a touch-sensitive display screen, a method for providing entry of a password, the method comprising:
    display a first array of a plurality of images on the touch-sensitive display prompting a user to select with a finger one of the plurality of images displayed;
    display at least another array of a plurality of images successive to the first array on the touch sensitive display prompting a user to select with a finger one of the plurality of images displayed in the another array of images;
    determine by a processor if a user selected a predetermined image from the first array of the plurality of images and a predetermined image from each at least another array of plurality of images displayed after the first array and determine recognition of predetermined finger print recognition from user interaction with the computer system; and
    permit user access to an application executable on the computer system contingent upon the determining step.

17. The computer system as recited in claim 16, wherein the determining step determines if a predetermined user finger recognition corresponds to a predetermined image.

18. The computer system as recited in claim 16, wherein the at least another array of a plurality of images successive to the first array includes a second and third array of a plurality of images.

* * * * *